Figure 1:
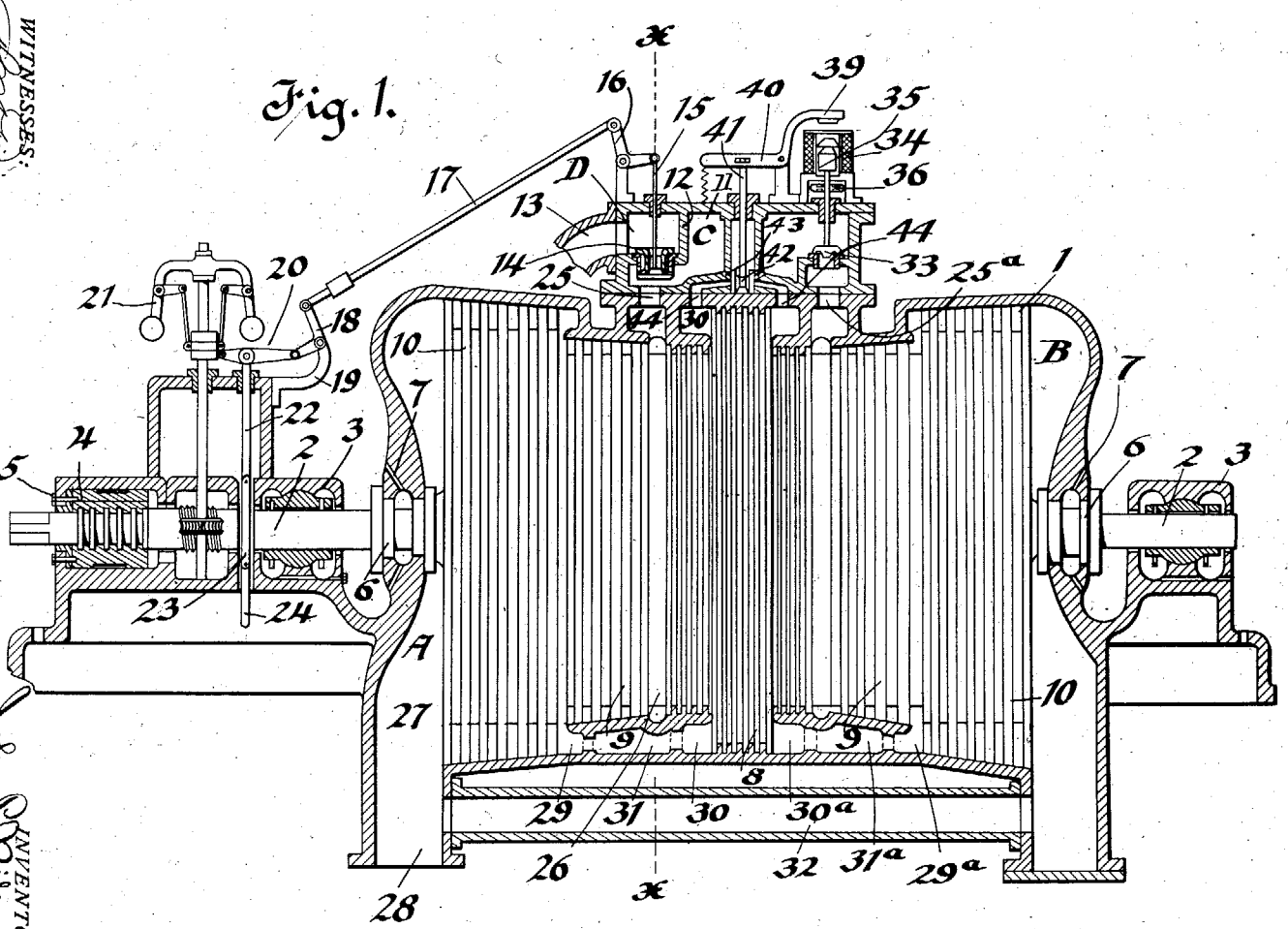

J. P. NIKONOW.

TURBINE AND REGULATING MEANS THEREFOR.

APPLICATION FILED JULY 3, 1908.

Reissued Sept. 20, 1910.

13,153.

4 SHEETS—SHEET 1.

WITNESSES:

E. M. McCallister

INVENTOR.

John P. Nikonow

BY

Jno. S. Green, his ATTORNEY IN FACT.

J. P. NIKONOW.
TURBINE AND REGULATING MEANS THEREFOR.
APPLICATION FILED JULY 3, 1908.
Reissued Sept. 20, 1910.
13,153.
4 SHEETS—SHEET 2.
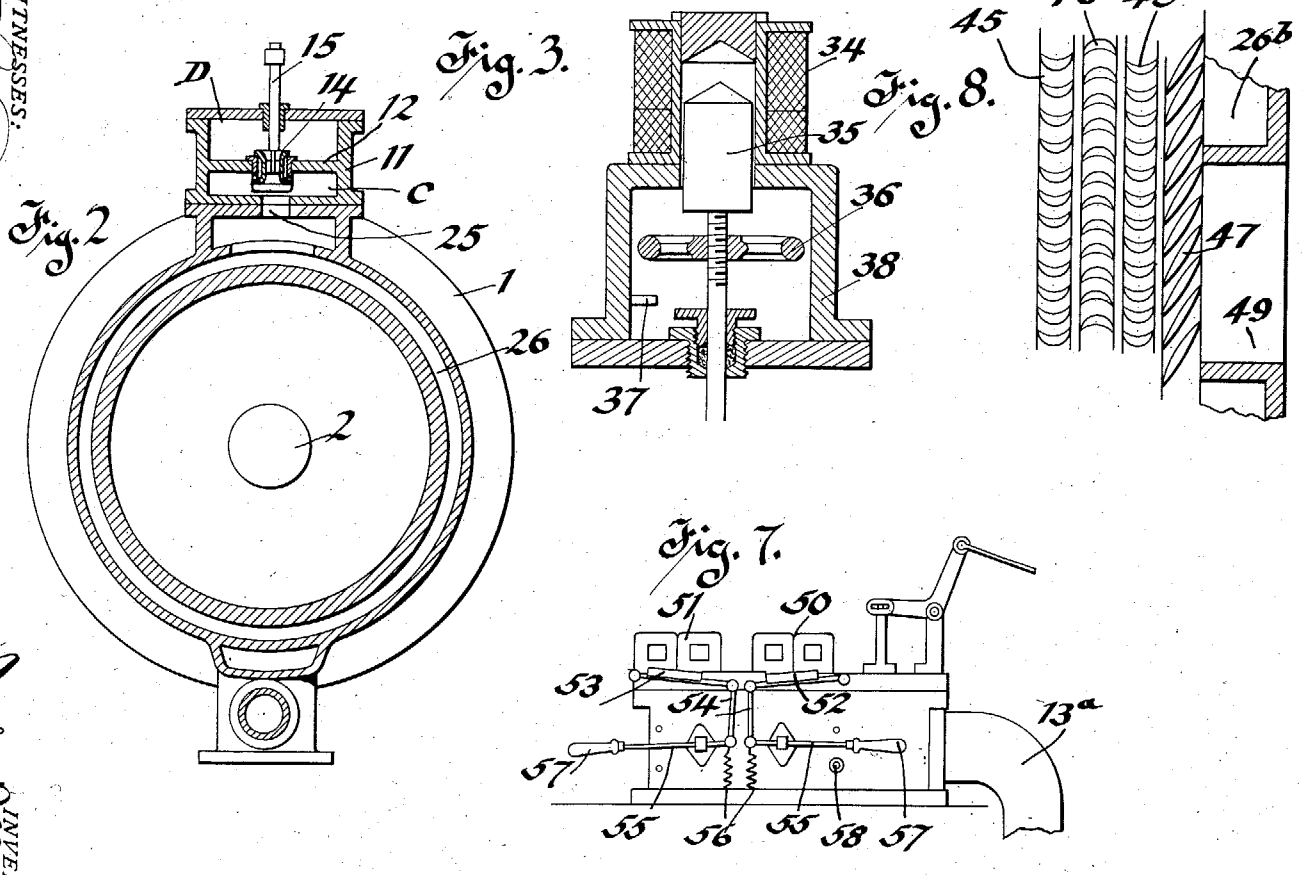
WITNESSES:
W. M. Ferd
E. M. McCallister.
INVENTOR.
John P. Nikonow
BY
Jno. S. Green
his ATTORNEY IN FACT.

J. P. NIKONOW.

TURBINE AND REGULATING MEANS THEREFOR.

APPLICATION FILED JULY 3, 1908.

Reissued Sept. 20, 1910.

13,153.

4 SHEETS—SHEET 3.

WITNESSES:

E. M. McCallister.

INVENTOR.

John P. Nikonow

BY Jno. S. Green his ATTORNEY IN FACT.

J. P. NIKONOW.

TURBINE AND REGULATING MEANS THEREFOR.

APPLICATION FILED JULY 3, 1908.

Reissued Sept. 20, 1910.

13,153.

4 SHEETS—SHEET 4.

WITNESSES:

E. M. McCallister

INVENTOR.

BY John P. Nikonow

Jno. T. Green his ATTORNEY IN FACT.

UNITED STATES PATENT OFFICE.

JOHN P. NIKONOW, OF EVANSVILLE, INDIANA, ASSIGNOR TO THE WESTINGHOUSE MACHINE COMPANY, A CORPORATION OF PENNSYLVANIA.

TURBINE AND REGULATING MEANS THEREFOR.

13,153. Specification of Reissued Letters Patent. Reissued Sept. 20, 1910.

Original No. 862,187, dated August 6, 1907, Serial No. 334,710. Application for reissue filed July 3, 1908. Serial No. 441,911.

*To all whom it may concern:*

Be it known that I, JOHN P. NIKONOW, a subject of the Czar of Russia, residing at Evansville, in the county of Vanderburg and State of Indiana, have invented certain new and useful Improvements in Steam-Turbines and Regulating Means Therefor, of which the following is a specification.

This invention contemplates certain new and useful improvements in turbines of either the reaction or impulse type, and has for an object to produce a turbine provided with separate parts or sections which are adapted to operate separately or in parallel.

A further object is to produce a turbine in which the supply of motive fluid is varied in accordance with the load demand on the turbine and in which one or more of the separate parts or sections are rendered effective in response to the load demands.

A further object is to produce an improved means whereby the turbine will operate with good economy and high efficiency through a wide range of loads.

It is well known that turbines do not operate with the best efficiencies for exceedingly light loads. This is due to the fact that the steam must be throttled before admittance to the first stage of the turbine. Throttling occasions a decrease in efficiency which I overcome in my turbine by admitting steam under initial pressure to the separate parts or sections during full load on the turbine and by admitting steam to one section only during light loads on the turbine. The efficiency is thus increased and the economy is very high throughout a wide range of loads.

Figure 4:
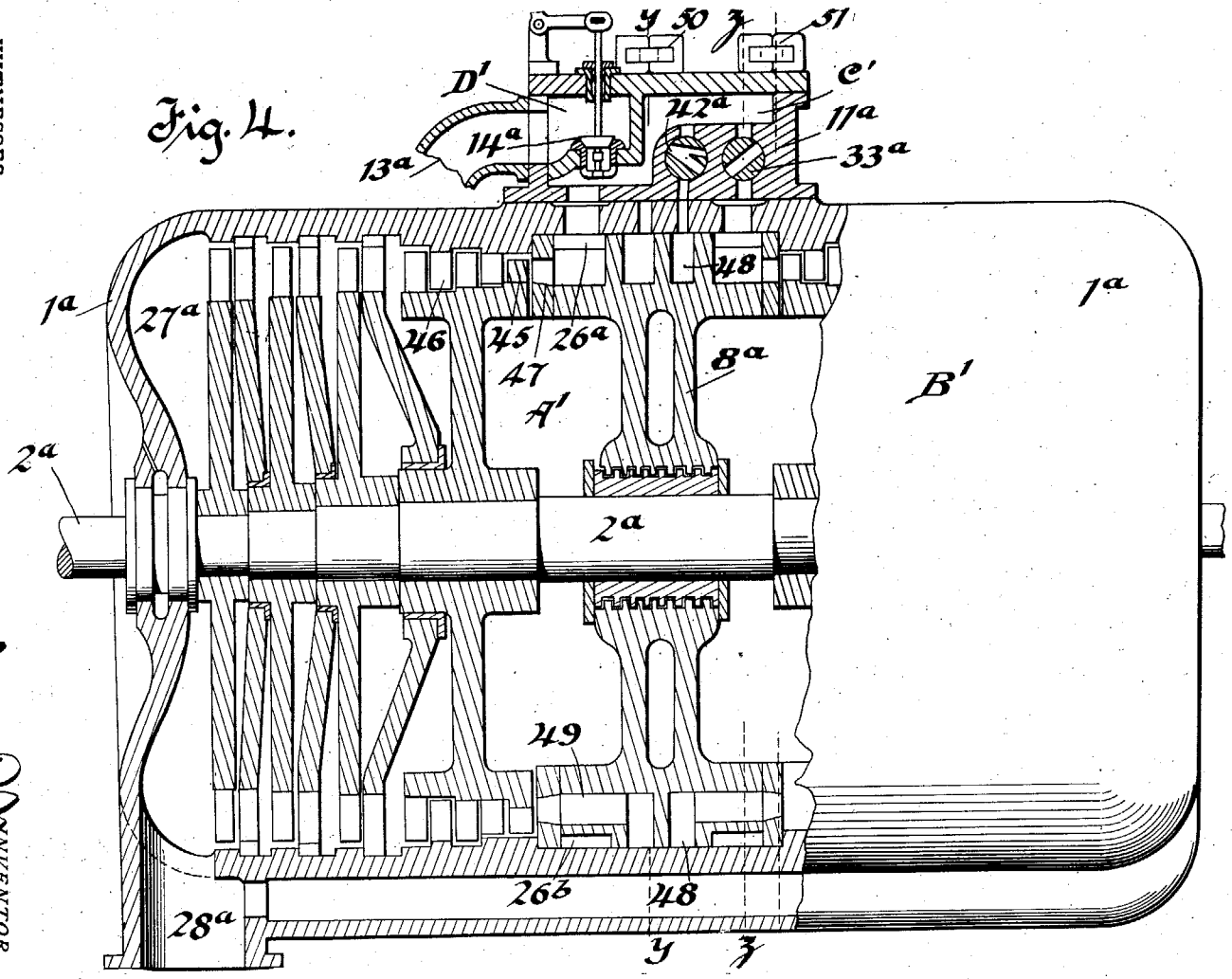
Figure 6:
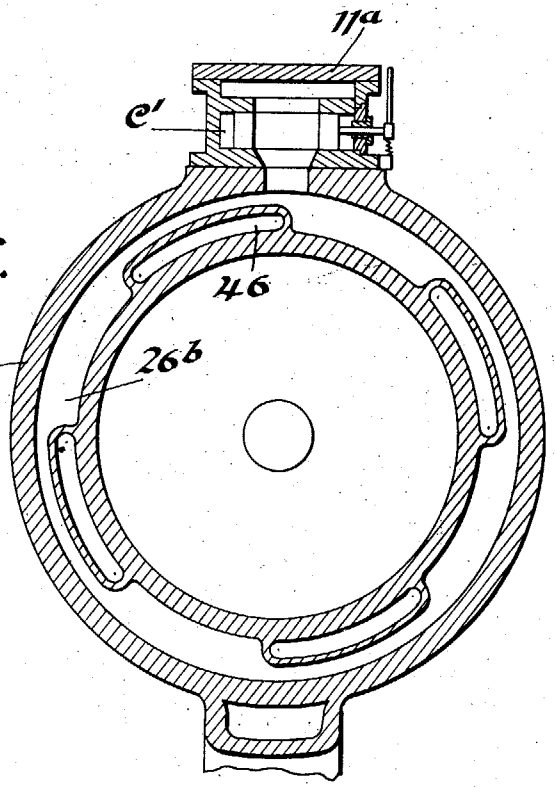
Figure 5:
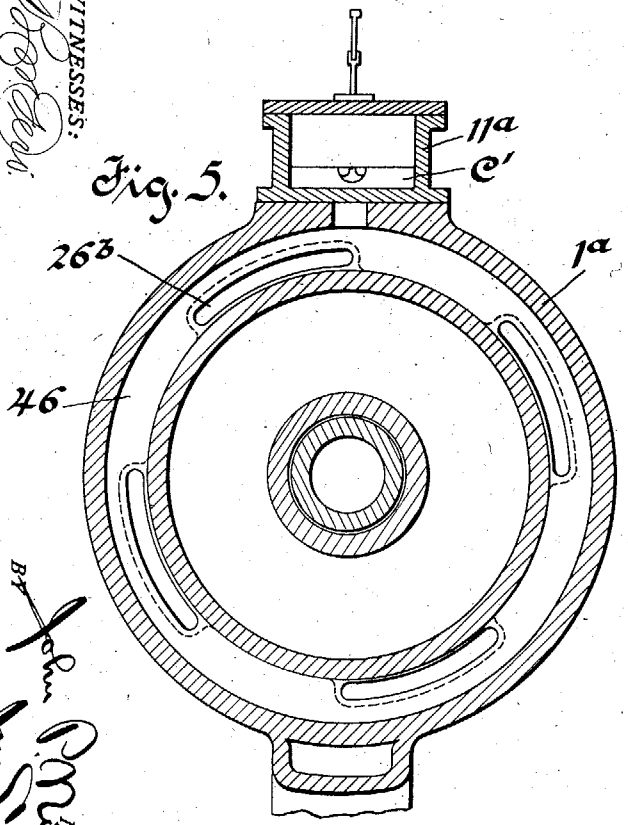

For a full description of the invention and the merits thereof and also to acquire a knowledge of the details of construction, reference is to be had to the following description and accompanying drawings, in which;

Figure 1 is a longitudinal sectional view of a turbine of the reaction type, embodying the improvements of my invention, the revoluble parts being shown in side elevation or in outline. Fig. 2 is a transverse sectional view on the line $x$—$x$ of Fig. 1. Fig. 3 is an enlarged detail sectional view of the solenoid for elevating one of the valves, and its concomitant parts. Fig. 4 is a partial side elevation and a partial section of a turbine of the impulse type embodying the improvements of my invention. Figs. 5 and 6 are transverse sectional views thereof on the lines $y$—$y$ and $z$—$z$ respectively of Fig. 4. Fig. 7 is a detail side elevation of the valve chest illustrated in Fig. 4. Fig. 8 is a diagrammatic view of some of the blades of the impulse turbine illustrated in Fig. 4.

Corresponding and like parts are referred to in the following description and indicated in all the views of the drawings by the same reference characters.

Referring to the drawings, the numeral 1 designates the turbine case through the ends of which the driving shaft 2 extends. The ends of the shaft are journaled in bearings 3, and one end of the shaft is extended to a thrust bearing 4, which is susceptible to regulation by means of screws 5 or similar devices, so that the entire rotor element of the turbine may be adjusted properly relative to the stationary casing 1. Stuffing boxes 6 are provided in the ends of the case, through which the shaft extends, and 7 designates passages for the admission of water or other cooling medium, supplied from any desired source, (not shown).

The case 1 is provided intermediate of its ends and preferably at its middle with a solid portion or partition 8 containing stuffing channels and dividing the case into two separate parts designated A and B respectively. The stuffing channels insure that the steam shall not pass from one part of the turbine into the other, except as hereinafter described. Each of these separate parts of the turbine includes two sets of revoluble blades and stationary blades, one set being larger than the others and the larger set being located outermost, the set of smaller diameter being designated 9 and the larger set 10, in both parts of the turbine respectively. And the case is, as best shown in Fig. 1, shaped to accurately accommodate the respective sets of blades of different diameters. The steam chest 11 is divided by the wall 12 into two compartments C and D, and the compartment D is in direct and open communication with the steam in the pipe 13. In the wall or partition 12 a port is formed to establish communication between the compartment D and the compartment C and for the purpose of controlling this communication, I have provided the puppet valve 14, the stem of which is secured at its upper end to the bell crank lever 16. This in turn is connected by means of the longitudinally extensible link 17 with another bell crank 18 fulcrumed on the upwardly extending arm of a frame or bracket 19, and the bell crank 18 has one of its two arms pivotally connected to the lever 20 at one end, the other end of said lever being directly connected to the collar of the centrifugal governor or regulator 21, which automatically actuates the valve 14 to admit for any given load the necessary volume of steam in the compartment C of the steam chest. In order to overcome or avoid static friction of the governing mechanism leading to the valve 14 I provide the depending arm 22 which has a strap 23 encircling an eccentric on the drive shaft 2, so that as the shaft rotates, the valve 14 will be caused to continuously pulsate or vibrate within its seat. If desired, a rod 24 may engage the same eccentric as the arm 22 for the purpose of operating a water pump. The shaft of the centrifugal governor or regulator 21 is engaged with the drive shaft 2 in the usual manner as by the worm gear shown.

The compartment C of the steam chest serves for both parts A and B of the turbine, but the only open ports leading therefrom to the revoluble elements of the turbine are the communication between the steam chest and the part A. In the present instance this open communication is effected by means of the port 25 which is always open and leads into the annular steam chamber 26. Hence it will be seen that as the steam is permitted to pass, by means of the valve 14 into the compartment C of the steam chest, to operate the part A alone, the same will pass freely into the chamber 26, thence into the series of blades 9 and through the same and thence in expansion, through the larger series of blades 10, finally passing into the exhaust chamber 27 and out through the exhaust port 28 into the condenser (not shown). In passing from the high pressure series of blades 9 to the low pressure series 10, the steam enters the low pressure chamber 29 which is in communication with the annular channel 30 around the smaller series of packing channels, by means of the cross passage 31.

As the parts A and B of my improved turbine are essentially similar I have deemed it necessary to describe only the part A with respect to its revoluble elements and interior arrangements.

From the description up to this point, it is evident that the axial thrust produced by the steam in the reaction turbine when only one part is working is counterbalanced by the thrust on the packing channels. Furthermore, the lateral face of the intermediate portion 8 is exposed to the steam pressure in the low pressure steam chamber 29 and consequently counterbalances the thrust occasioned in the low pressure stage on the blades 10 of the turbine. This pressure is communicated to the annular chamber 30 through the passage 31 which communicates with the annular chamber 29.

As shown best in Fig. 1, both parts A and B of my improved turbine have their exhaust passages connected together by means of the pipe or channel 32. Hence, when only one part is working, the other is under the pressure of the condenser, and running in vacuum, has no loss from steam friction.

As stated at the outset of this specification, one of the primary objects of my invention is to provide means for automatically controlling the delivery of steam to the turbine and the distribution of the steam to the separate sections of the turbine so that one or both of the parts A and B may be rendered effective in developing power. This result is accomplished by means of a valve 33 which controls the communication between the compartment C of the steam chest and the part B, said valve when open allowing the steam to pass into the part B through the port 25[a]. The valve 33 is controlled and operated by means of a solenoid 34 which preferably has two coils, to wit, one main coil, in series with the line (or taken from the secondary coil of a series transformer) and another coil in shunt. As the electric current increases, for instance, in load to a certain point, the series coil becomes energized and draws up the plunger 35 which is secured to the stem of the valve 33, thereby opening the valve 33 and admitting steam from the compartment C of the steam chest into the part B of the turbine. As it is incumbent upon the main governor 21 to regulate the steam pressure for both sides or parts A and B of the turbine alike, the valve 33 is designed to have only two positions, namely, fully closed or fully opened, and it is of such size as to allow the steam to flow into the part B under full pressure thereby avoiding any throttling effect upon the steam.

In view of the fact that a stronger magnetic pull is necessary to raise the plunger 35 than is necessary to maintain it in the raised position, there is no point of load on the turbine at which the plunger 35 will hunt, that is, reciprocated in response to slight variations of load. When the load on the turbine is sufficient to open the valve 33 through the agency of the solenoid 34 the valve will remain open until the load has decreased to such an extent as to materially decrease the magnetic effect of the solenoid.

The valve 33, as shown closes by its own weight, but it is manifest that a spring may be added if found necessary.

The shunt coil is provided in addition to the series coil in order that the valve 33 may be operated from a switch-board or the like, if necessary, by means of any suitable controlling mechanism such as a double throw switch, so that the operator may introduce a current into the auxiliary shunt coil either with or against the series coil, thereby increasing or decreasing the magnetic force of the solenoid. If desired, and found necessary, the valve 33 may also be operated manually by means of a hand wheel 36, as best shown in Fig. 3. This hand wheel operates to raise the valve by being mounted with screw threaded engagement on the threaded portion of the valve stem, so that by turning the hand wheel down until it strikes a lug 37 projecting forwardly from one arm of the supporting bracket 38 and thence continuing the rotary movement of the hand-wheel, the valve may be raised. Under ordinary conditions, when this hand wheel is not in use, it must be raised relatively to the stem of the valve so as to not interfere with the electric actuation of the valve.

In addition to the function of automatically admitting steam to the part B of the turbine, the solenoid 34 is arranged to automatically admit high pressure steam to both the low pressure sets of blades so that the turbine may work up to an overload. Under overload, with corresponding increase of current, the solenoid 34 pulls the armature 39 downwardly. This armature is mounted upon the arm of a lever 40 fulcrumed intermediate of its ends and spring returned as shown. The lever 40 is connected by means of a pin and slot to the stem 41 of an over load valve 42 controlling two ports 43. These ports establish communication between the compartment C of the steam chest and the two passages having open communication by means of two ports 44 with the two channels 30 and 30ᵃ. As these channels communicate by means of the cross passages 31, 31ᵃ with the low pressure admission chambers 29 and 29ᵃ, it is obvious that when the valve 42 is opened, high pressure steam will be admitted directly to the low pressure blades 10. As these blades are of larger size than the high pressure blades 9 in view of the fact that under ordinary conditions they work under half expanded steam, it is manifest that the turbine may develop more energy and thus work up to an over load, by the arrangement described, provided of course that the valve 14 is of sufficient size to allow this additional or extra steam to flow.

The generic principles of my invention are applicable to turbines of the impulse type as well as those of the reaction type, one embodiment of which latter type has been hereinbefore described. As an adaptation of the invention to a turbine of the impulse type, reference is to be had to Figs. 4, 5, 6, 7, and 8 of the drawings. Here the two parts A′ and B′ are substantially alike as to their revoluble and other interior elements, the case 1ᵃ being divided into two substantially equal parts as shown, by means of the central abutment or partition 8ᵃ of the case, the shaft 2ᵃ extending through the ends of the said case. The steam chest 11ᵃ, furthermore, is divided into the two compartments C′ and D′, the latter being connected to the steam supply pipe 13ᵃ. The steam is admitted into the high pressure chamber 26ᵃ by the opening of the valve 14ᵃ and the expanded steam escapes from the exhaust chambers 27ᵃ, through the exhaust port 28ᵃ, all substantially like the construction heretofore described with respect to the reaction turbine. In this modification, each part A′ and B′ of the turbine includes rotary blades 45 and stationary blades 46 and 47, the latter being of nozzle formation as illustrated in Fig. 4, and the intermediate stationary portion of the turbine case, 8ᵃ is provided with an annular channel 48 communicating by means of cross passages 49 with the stationary blades 47.

As best shown in Figs. 4, 6 and 8, the chamber 26ᵃ communicates or opens into the first series of blades for only a sectional part of the circumference thereof, by means of cross passages 26ᵇ, whereas under certain conditions as will be hereinafter specified, the cross passages 49 also admit steam to the remainder of the first series of blades. The relative proportions of the two series of admission channels 26ᵇ and 49, as to the number and size of each series may be varied according to the requirements of different installations, for instance, the series of passages 26ᵇ may include one-half or two-thirds of the circumference of the first blades and the cross passages 49 the remainder of the circumference of the first blades in the series, and these two series of cross passages 26ᵇ and 49 preferably alternate as shown best in the diagrammatic view, Fig. 8.

In the steam chest 11ᵃ is mounted the valve 33ᵃ designed to control the admission of steam from the compartment C′ into the compartment B′ of the impulse turbine, and in said steam chest is also mounted the overload valve 42ᵃ, governing the admission of steam from said compartment C′ to the annular channel 48. Valves like the valves 33 and 42 may be embodied in this modified form of turbine of the impulse type, but for the purpose of illustrating another modification or embodiment of the invention I have shown the valves 33ᵃ and 42ᵃ which rotate to open and close their respective ports instead of raising and lowering, and which are operated by two independent electromagnets 50 and 51. The armatures 52 and 53 of these magnets are, as best shown in Fig. 7, connected by means of links 54 to arms 55 on the ends of the valve stems and are returned to their normal positions by means of springs 56. The arms 55 may be provided with handles 57 for manual actuation, and steadying pins 58 may be employed if desired.

When this turbine is working up to its normal load, the steam is admitted into only a sectional part of the first blades, through the cross passages 26[a]. Under overload, the valve 42[a] will be opened by this electromagnet and steam will be thereby admitted into the annular channel 48 and thence through the cross passages 49 into the remainder of the blades, circumference, so that the full force of the steam will be directed against the blades.

From the foregoing description in connection with the accompanying drawings, it will be seen that I have provided an improved turbine embodying a divided turbine unit or two distinct and separate parts in one case, both capable, by automatic regulations, of operating together, or one of which is capable of being automatically rendered effective or ineffective as a power transmitting agent, and that I have provided means in the regulating apparatus to accomplish this purpose, all combining to effect economies in the installation and maintenance. For instance, in an electric plant, instead of using two separate turbo-generator units, both in parallel for heavy night load, and shutting down one unit during the day time, my turbine may be used, as it will perform automatically, as before set forth, both day and night equally with the same degree of efficiency. It is therefore evident that the cost of my turbine will be much less than the cost of two separate units for the same work.

Having thus described the invention, what is claimed as new is:

1. In a turbine, the combination of a driving shaft, two distinct revoluble elements mounted in common upon said shaft, means for admitting steam to one of said elements, and means automatically governed by the load and independent of the speed of the turbine for admitting the steam to both of said elements simultaneously.

2. In a turbine, the combination of a case, a driving shaft journaled therein, the case being provided with an intermediate abutment or partition dividing it into two distinct compartments, a revoluble element in each of said compartments, a steam chest, one compartment of which has open communication with the first set of blades of one compartment of the case and has a valved communication with the other compartment of the case, governor controlled means for automatically admitting steam to the said compartment of the steam chest, and means governed by the load and independent of the speed of the turbine for controlling the valved communication between the steam chest and the said compartment of the case.

3. In a turbine, the combination of two distinct turbine units which embody revoluble blades, means governed by the load for admitting steam to both units simultaneously, and means for automatically admitting high pressure steam to low pressure blades of both units, said last named means being actuated by the other means as set forth.

4. In a turbine, the combination of two revoluble elements embodying high pressure blades and low pressure blades, and a high pressure chamber communicating with the first blade of the high pressure series, and a low pressure chamber communicating with the last blade of the high pressure series and the first blade of the low pressure series, there being provided a passage communicating directly with the low pressure chamber at one end, governor controlled means, for controlling the delivery of steam to said high pressure chamber, and a high pressure chamber independent of the first named high pressure chamber and communicating with the said passage at its other end, and means governed by the load and independent of the speed of the turbine for automatically admitting high pressure steam to the second mentioned high pressure chamber, for the purpose specified.

5. In a turbine, the combination of two distinct turbine units, each embodying a revoluble element, a steam chest common to both units and divided into compartments, one of said compartments having open communication with one unit and a valve controlling its communication with the other unit, means for admitting steam into the said compartment, a solenoid, and a plunger having operative connection with the said valve, the plunger being arranged to be moved by the energization of said solenoid, substantially as described.

6. In a turbine, the combination of two distinct turbine units, each embodying a revoluble element, a steam chest common to both units and divided into compartments, one of said compartments having open communication with one unit and a valve controlling its communication with the other unit, means for admitting steam into the said compartment, a solenoid, a plunger having operative connection with the said valve, the plunger being arranged to be moved by the energization of the solenoid, and means for manually opening said valve.

7. In a turbine, the combination of two distinct turbine units, each embodying a revoluble element, a steam chest common to both units and divided into compartments, one of said compartments having open communication with one unit and a valve controlling its communication with the other unit, means for admitting steam into the said compartment, a solenoid, a plunger having operative connection with said valve, the plunger being arranged to be moved by the energization of the solenoid, and means for manually opening said valve, said means comprising a threaded valve stem, a hand wheel having threaded engagement with said stem, and a stop for the movement of said hand wheel in one direction, substantially as described.

8. In a turbine, the combination of two distinct turbine units, each embodying a revoluble element, a steam chest common to both units and divided into compartments, one of said compartments having open communication with one unit and a valve controlling its communication with the other unit, means for admitting steam into the said compartment, a solenoid, a plunger having operative connection with the said valve, the plunger being arranged to be moved by the energization of the solenoid, an armature also arranged to be attracted by said solenoid, and an overload valve designed to be actuated by the movement of said armature, the turbine units embodying both high pressure and low pressure blades, there being passages provided for directly admitting high pressure steam to the low pressure series of blades, the said admission of steam being controlled by said overload valve.

9. In a turbine, the combination of two distinct turbine units, each embodying a revoluble element, a steam chest common to both units and divided into compartments, one of said compartments having open communication with one unit, and a valve controlling its communication with the other unit, the units embodying high pressure blades and low pressure blades and means for admitting high pressure steam directly to the low pressure blades, said means including an armature arranged to be attracted by a solenoid, a plunger arranged to be moved by the energization of said solenoid, an automatically returned lever on one arm of which the armature is carried, and a valve operatively connected to the other arm of said lever, and there being provided ports and passages for the live steam, the said ports being controlled by said valve.

10. In a turbine, the combination of a case, a driving shaft journaled therein, the case being provided with an intermediate abutment dividing it into two distinct compartments, a revoluble element in each of said compartments, each revoluble element embodying a series of high pressure blades and a series of low pressure blades, means automatically governed by the load for admitting steam to one of said revoluble elements, or to both of said revoluble elements simultaneously, and means also governed by the load for admitting steam directly to the low pressure blades of both elements as well as to the high pressure blades.

11. In combination with the rotor element of a turbine, a supply valve and an overload valve, and means responsive to load variations and independent of speed variations for controlling the operation of said overload valve.

12. In a turbine, the combination of a case, a driving shaft journaled therein, two distinct revoluble elements mounted in common upon said shaft and within the case, a steam chest, one compartment of which has open communication with a set of blades of one revoluble element, and a valved communication with a set of blades of the other revoluble element, governor controlled means for automatically admitting steam to the said compartment of the steam-chest, and electrically actuated means governed by the load on the turbine for controlling the valved communication between the steam-chest and the other revoluble element.

13. In combination with the rotor element of a turbine, speed responsive means for controlling the delivery of motive fluid to the turbine, load responsive means independent of the speed of the turbine and of said speed responsive means for controlling the delivery of an auxiliary supply of fluid to the turbine.

14. In combination with the rotor of a turbine, a main supply valve and an overload valve delivering motive fluid to the turbine, speed responsive means controlling the operation of said main supply valve, and load responsive means for controlling the operation of said overload valve.

15. In combination with the rotor element of a turbine, a casing therefor provided with a plurality of series of fluid delivery ports, means for delivering motive fluid to said ports, and means responsive to variations of load on the turbine and independent of the speed for proportioning the delivery of motive fluid through one series of said ports in accordance with the load demand.

16. In combination with the rotor element of a turbine, a casing therefor provided with a plurality of series of fluid delivery ports, means for delivering motive fluid to said ports, and load responsive means for successively opening one series of said ports to proportion the delivery of motive fluid to the turbine in accordance with the load demand.

17. In combination with a multi-stage turbine, governor controlled means for delivering motive fluid to a high pressure stage of said turbine, and means, independent of said governor controlled means and responsive to variations of load on the turbine for by-passing motive fluid around the high pressure stage and delivering it to a stage of lower pressure.

18. In combination in a multi-stage turbine, means for delivering motive fluid thereto, and load responsive means independent of said before mentioned means and independent of the speed of the turbine for proportioning the delivery of motive fluid to the stages of the turbine.

19. In combination in an elastic fluid turbine, a rotor element, a casing therefor provided with a plurality of fluid delivery ports, speed responsive means for delivering motive fluid to said ports, and load responsive means for proportioning the delivery of motive fluid through said ports in accordance with the load demand.

20. In combination in a turbine, two separate multi-stage sections, means for delivering motive fluid to each section, a valve controlling the delivery of motive fluid to one section, and an overload valve for simultaneously by-passing motive fluid, received from said means, around a high pressure stage of each section.

21. In combination in a turbine, two separate multi-stage sections, speed responsive means controlling the delivery of motive fluid to both of said sections, a valve receiving motive fluid from said means and controlling the delivery of motive fluid to one of said sections, and an overload valve receiving motive fluid from said means for simultaneously by-passing motive fluid around a high pressure stage of each section.

22. In combination in an impulse turbine, alternately arranged fluid delivery passages, speed responsive means for delivering motive fluid to one of said passages, and load responsive means for delivering motive fluid to the next adjacent fluid delivery passage.

23. In a multi-stage turbine, governor controlled means for admitting motive fluid to the initial stage of said turbine, and load responsive means, independent of the speed of the turbine for by-passing fluid around the initial stage and admitting it to a stage normally of lower pressure.

24. In a multi-stage turbine, governor controlled means for delivering motive fluid to the turbine, and load responsive means independent of the speed of the turbine for by-passing motive fluid around a stage of said turbine.

In testimony whereof, I have hereunto subscribed my name this 27th day of June 1908.

JOHN P. NIKONOW.

Witnesses:

VINCENT CHEATHAM,

J. M. GANZER.